April 21, 1959
H. O. CASH
2,882,986
SAFETY DEVICE FOR PUTTING AN AUTOMOBILE
INTO A NON-DRIVABLE DISPOSITION
Filed April 29, 1957
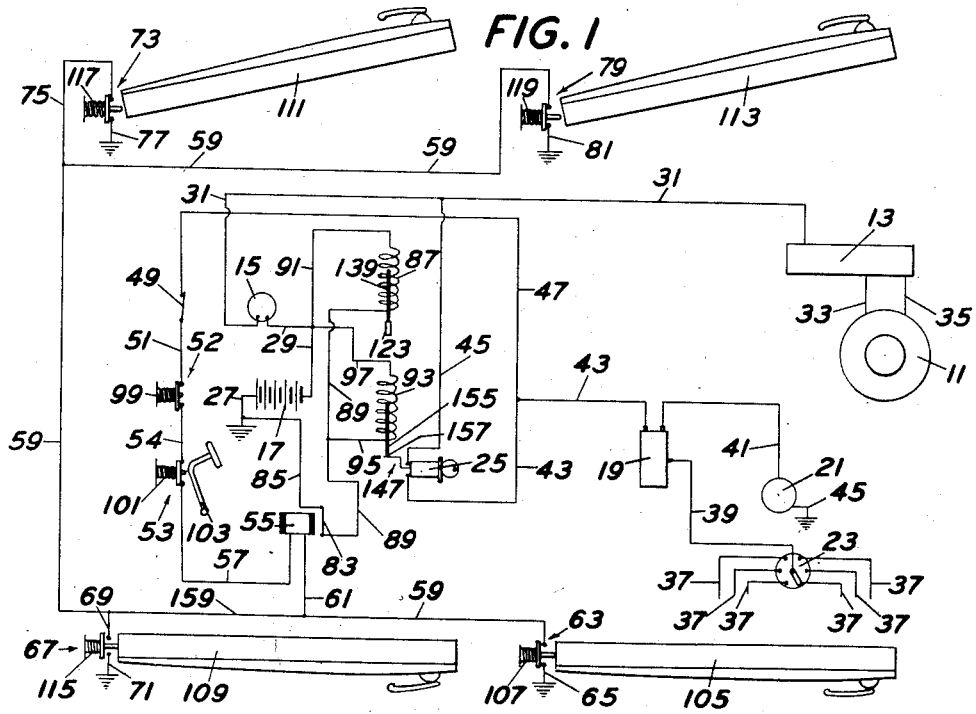
INVENTOR.
HOMER O. CASH
BY John R. Walker III
Attorney

United States Patent Office 2,882,986
Patented Apr. 21, 1959

2,882,986

SAFETY DEVICE FOR PUTTING AN AUTOMOBILE INTO A NON-DRIVABLE DISPOSITION

Homer O. Cash, Shelby County, Tenn.

Application April 29, 1957, Serial No. 655,747

6 Claims. (Cl. 180—82)

This invention relates to a safety device for automobiles, particularly adapted to be used in automobiles having automatic transmission.

By "automatic transmission" is meant that type of automotive drive, such as fluid drive, which is controlled by push buttons or a lever. This is in contradistinction to the gear-type of drive in which the gears are manually shifted by a lever.

As is known by those familiar with the automobiles having automatic transmission, there is the danger that the transmission control will be left in a drive position by the driver and the ignition switch left on when he leaves the car, which could result in an accident. Thus, for example, with the type using push buttons for the transmission control, the driver may have intended to push in on the neutral button before he got out of the car, but did not push the button in far enough for it to catch properly in the neutral position. Or he may have forgotten, for one reason or another, to put the control in a neutral position.

Whereas, in the older type of cars with manual gearshift, the motor would generally stop if the car were left in gear and the clutch released, such is not the case with cars having automatic transmission; and the danger of leaving the car without its being in a neutral position and with the ignition switch on is aggravated because such a condition is not readily apparent to the driver of a car having automatic transmission.

Thus, the present invention is directed towards overcoming the above-mentioned danger present in automobiles having automatic transmissions by providing a safety device which completely eliminates this danger.

An important object of the present invention is to provide safety means for use in conjunction with an automobile having automatic transmission so that, if the driver leaves the automobile with the motor running, the transmission control will be positively and automatically shifted into a neutral position unless already in such a position.

A further object is to provide such safety means in which the opening of one of the doors of the auto will automatically shift the transmission control into a neutral position unless already in this position or unless the brake pedal is in a depressed or braking position.

A further object is to provide manual push-button means for retaining the safety means inoperative if the doors cannot be closed for any reason.

A further object is to provide means for automatically turning off the ignition switch when one of the doors is opened.

A further object is generally to improve the design and construction of safety devices for automobiles.

The means by which the foregoing and other objects of the present invention is accomplished and the manner of their accomplishment will be readily understood from the following specification upon reference to the accompanying drawings, in which:

Fig. 1 is a diagrammatic view, showing the present invention employed with an automobile having automatic transmission.

Fig. 2 is a fragmentary view of the transmission control of an automobile using the present invention, with parts broken away for purposes of illustration and showing the control in a position other than neutral.

Fig. 3 is a view similar to Fig. 2, but showing the control in a neutral position.

Fig. 4 is a sectional view showing the ignition switch of the automobile and the means for turning it off.

Referring now to the drawings in which the various parts are indicated by numerals, in Fig. 1 is shown a typical ignition system of an automobile in which automatic transmission is employed. In the system shown, only the basic components have been included for purposes of clarity and these components include a generator 11, a current and voltage regulator 13, an ammeter 15, a battery 17, an ignition coil 19, a breaker 21, a distributor 23, and an ignition lock-switch 25 modified in accordance with the present invention.

The above-mentioned components are shown in the drawings connected as follows: A conductor 27 grounds one side of battery 17. Ammeter 15 is connected to battery 17 by a conductor 29 and to current and voltage regulator 13 by a conductor 31 which, in turn, is connected to generator 11 by conductors 33 and 35. Conductors 37 lead from distributor 23 to the individual spark plugs, not shown. A conductor 39 joins distributor 23 with ignition coil 19, which, in turn, is connected to breaker 21 by a conductor 41 and to ignition lock-switch 25 by a conductor 43. Breaker 21 is connected to ground by a conductor 45 and ignition lock-switch 25 is connected to conductor 31 by a conductor 45 to complete the ignition circuit.

In carrying out the present invention in conjunction with the above-described typical ignition system, a conductor 47 connects one contact of a first switch 49 to conductor 43 and a conductor 51 connects the other contact of switch 49 to one contact of a second switch 52. The other contact of switch 52 is connected to one contact of a third switch 53 by a conductor 54. The other contact of switch 53 is connected to one end of the magnetic coil of a relay 55 by a conductor 57 and the other end of the relay coil is connected to a conductor 59 by a conductor 61. One contact of a door switch 63 is connected to conductor 59 and the other contact is connected to ground by a conductor 65. One contact of another door switch 67 is connected to conductor 59 by a conductor 69 and the other contact is connected to ground by a conductor 71. One contact of another door switch 73 is connected to conductor 59 by a conductor 75 and the other contact is connected to ground by a conductor 77. One contact of still another door switch 79 is connected to conductor 59 and the other contact is connected to ground by a conductor 81.

It is apparent that the above-described circuit is arranged so that door switches 63, 67, 73, and 79 are in parallel with one another and this group of door switches is, in turn, in series with the coil of relay 55, third switch 53, second switch 52, first switch 49, ignition lock-switch 25, ammeter 15, and battery 17.

Relay 55 is provided with a relay switch 83, one contact of which is connected to conductor 27 by a conductor 85 and the other contact is connected to one end of a first solenoid 87 by a conductor 89. The other end of solenoid 87 is connected to conductor 29 by a conductor 91. A second solenoid 93 is connected in parallel with first solenoid 87 as by a conductor 95 connecting one end of second solenoid 93 to conductor 89 and a conductor 97 connecting the other end of the second solenoid to conductor 91. Thus, the parallel group of solenoids are connected across battery 17 in series with relay switch 83.

Second switch 52 is a push-button type of switch that is urged into a normally closed position by a spring 99. Switch 52 may be manually operated to open the switch and is located at any position in the automobile that is convenient for operation by the driver.

Third switch 53 is urged into a normally closed position by a spring 101, and is disposed in the path of the brake pedal 103 of the automobile. Switch 53 is arranged so that it will be contacted by brake pedal 103 and opened when the brake pedal is moved into the depressed or braking position.

Door switch 63 is carried by the casing of a rear door 105 and disposed in the path of the door so that when the door is closed it contacts the switch and moves it into an open position, and when the door is opened it moves away from the switch, allowing spring 107 to urge the switch into a closed position. Similarly, door switches 67, 73, and 79 are carried by the casings of front door 109, front door 111, and rear door 113, so that when the doors are respectively closed the related switches are contacted and moved into an open position, and when the doors are respectively opened the related switches are released, allowing springs 115, 117, and 119, respectively, to urge its related switch into a closed position. In Fig. 1, doors 105, 109 are shown in a closed disposition with switches 63, 67 open, and doors 111, 113 are shown in an open disposition with switches 73, 79 closed.

In Figs. 2 and 3 is shown a broken-away view of the transmission control 121 of the automobile, herein referred to, that has automatic transmission. Transmission control 121 includes a manually-operated shifting means shiftable into and out of a neutral position. Although in the present drawings said manually-operated shifting means is shown as the push-button type, including a neutral push button 123 and other drive push buttons 125, it is not intended to so limit the invention to this particular type of automatic transmission control, but it may be applied to other types as well, for example, the lever-type of automatic transmission control.

Details of the transmission control 121 have not been shown since they form no part of the present invention except the modified portion hereinafter described. Transmission control 121 is provided with the usual casing 127 and the control operates in the conventional manner as follows: The driver pushes one of the push buttons 123, 125 for the desired action of the automobile. For example, in Fig. 2 is shown the lower one of the drive push buttons in an inward or engaged position which through other mechanisms places the car in the drive disposition indicated by this button. In Fig. 3 is shown the neutral push button 123 shifted into the inward or engaged position which places the car's transmission in neutral. When one button is pushed in, the previous button which was pushed in will be automatically released and will return to the outward or disengaged position. If a button is not pushed fully inward, it will not catch and the driver may have the car in the same drive position although he thinks he has changed the drive position. This can be a dangerous situation—as, for example, if the driver has come to a stop and, because he is on a level street and is going to be out of the car only a few minutes, he leaves the motor running and does not put on the brake. The driver thinks he has put the car in neutral, but actually he did not push the neutral button in far enough and the car is still in a drive position. Then the driver gets out of the car and, when he turns his back, the car runs into a lamp post or some other obstruction.

To carry out the present invention and eliminate the above-described danger, transmission control 121 is modified as follows: Actuating means, as an upstanding lug 129, is fixedly attached to and carried by neutral push button 123. First switch 49 is disposed in the path of movement of lug 129 so that when neutral push button 123 is in an outward or disengaged position, which occurs when the transmission control is in a drive position, switch 49 will be contacted and closed by lug 129. Thus, switch 49 is provided with a stationary contact 131 supported from casing 127 by an insulated base 133. A moving contact 135 is suspended from base 133 by an elongated resilient and conductive strip 137. In Fig. 2, switch 49 is shown in a closed disposition with contact 135 being forced into abutment with contact 131 by lug 129.

Transmission control 121 is further modified so that neutral push button 123 is caused to move to an inward or engaged position when solenoid 87 is energized. Thus, solenoid 87 is provided with a plunger 139, which, under the magnetic influence of the solenoid, moves inwardly or to the right as viewed in Figs. 2 and 3 when the solenoid is energized. Plunger 139 is coupled to an upstanding arm 141 fixedly attached to neutral push button 123 whereby energization of solenoid 87 will cause transmission control 121 to be shifted to a neutral position, if not already in such a position.

In further carrying out the present invention, lock-switch 25 is modified as follows: To the rearward end 143 of the revolving plug 145 of lock-switch 25 is fixedly attached a crank-like arm 147, which includes an elongated body portion 149 having an end portion 151 projecting substantially perpendicularly and rearwardly from the upper end of body portion 149, and having a second end portion 153 projecting substantially perpendicularly and forwardly from the lower end of body portion 149. Solenoid 93 is provided with a plunger 155 which is hingedly coupled to end portion 151 as at 157, whereby the energizing of solenoid 93 will cause movement of plunger 155 to turn off lock-switch 25.

The safety means of the present invention acts to prevent the previously described danger inherent in cars having automatic transmission by its operation as follows: For purposes of illustration, assume that the motor is running, the car is in a drive position, and switches 52, 53 are in a normally closed position shown in Fig. 1. Now, with the above conditions existing, a person opens one of the doors 105, 109, 111, or 113, which closes one of the related switches 63, 67, 73, or 79 to complete the circuit through the coil of relay 55, which acts to close switch 83. The closure of switch 83 completes the circuit through solenoids 87 and 93, causing the simultaneous energizing thereof, which, in turn, turns off lock-switch 25 and shifts transmission control 121 to the neutral position. It will be understood that, if transmission control 121 is in a neutral position, switch 49 will be open, which will prevent the energization of solenoids 87, 93 and the motor will continue to run even though a door is opened.

If, for some reason, the driver desires to keep the motor running with transmission control 121 in a position other than neutral and with a door open, as, for example, if a door is hung, the driver may push button switch 52 to prevent solenoids 87, 93 from being energized in the above-described manner. Additionally, the motor may be kept running with the doors open and transmission control 121 in a position other than neutral by depressing brake pedal 103 to open switch 53.

If desired, either solenoid 87 or 93 may be omitted, which will cause only the lock-switch 25 to be turned off or the transmission control to be shifted to neutral.

From the foregoing description, it is apparent that an efficient and positive operating safety means is provided for automatically shifting an automobile into neutral and/or for automatically turning the ignition switch off when a door of the automobile is opened and the automobile is in a drive disposition.

I claim:
1. In a motor vehicle of the type in which is provided automatic transmission including controls for said trans- mission having a shifting means shiftable into and out of a neutral position and a drive position, and in which are provided a brake pedal, an ignition system including a source of power and an ignition lockswitch, and a plurality of vehicle doors; safety means for preventing the driver from leaving the vehicle with the ignition switch on and with said shifting means in a drive position, said safety means comprising a first circuit means, a first switch being in a closed disposition when said shifting means is in a drive position and arranged to be opened when the shifting means is in a neutral position, a normally closed second switch arranged to be opened by manually pushing thereon, a normally closed third switch disposed in the path of said brake pedal and arranged to be opened upon the depression of the pedal, a relay including a relay coil and a relay switch operated thereby; said first switch, said second switch, said third switch, said relay coil, said ignition lock-switch and said source of power being disposed in series in said first circuit means; a plurality of open door switches arranged in parallel with one another and in series in said first circuit means, said door switches being respectively disposed in the path of said doors and arranged to be respectively closed by the opening of the doors and respectively opened by the closing of the doors, a second circuit means, a first solenoid means coupled to said shifting means and arranged for the shift thereof into a neutral position when the first solenoid means is energized, a second solenoid means coupled to said ignition lock-switch and arranged for the turning off thereof when the second solenoid means is energized, said first and second solenoid means being in parallel with one another to form a group; said relay switch, said source of power and said group being in series in said second circuit means whereby the energizing of said first circuit means upon the opening of one of said doors is effective to close said relay switch to cause said first and second solenoid means to be energized thereby shifting said shifting means into neutral and turning off said ignition lock-switch.

2. In a motor vehicle of the type in which is provided automatic transmission including controls for said transmission having shifting means shiftable into and out of a neutral position and a drive position, and in which are provided a brake pedal, an ignition system including an ignition circuit and an ignition lock-switch, and a plurality of vehicle doors, said ignition lock-switch being adapted to be turned to an "on" position in which said ignition circuit is completed and to an "off" position in which said ignition circuit is broken; safety means for preventing the driver from leaving the vehicle with the ignition lock-switch in said "on" position and with said shifting means in a drive position, said safety means comprising a first electrically operated means coupled to said shifting means for shifting said shifting means into a neutral position, a second electrically operated means coupled to said ignition switch for turning said lock-switch to said "off" position, electrical circuit means for controlling said first and second electrically operated means, switch in said circuit means controlled by said shifting means to render said circuit means inoperative when said shifting means is in a neutral position, means in said circuit means associated with said doors and arranged to complete said circuit means when one of said doors is opened for the operation of said first and second electrically operated means when said shifting means is in a drive position, additional switch means in said circuit means including a switch associated with said brake pedal and arranged for opening said circuit means independently of said shifting means and said doors.

3. In a motor vehicle of the type in which are provided a brake pedal, an ignition system including an ignition circuit and an ignition lock-switch including a rotatable key plug adapted to be rotated between an "on" position in which said ignition circuit is completed and an "off" position in which said ignition circuit is broken, and a plurality of vehicle doors; safety means for preventing the driver from leaving the vehicle with the key plug in an "on" position comprising solenoid means coupled to said key plug for rotating said key plug to said "off" position, electrical circuit means for controlling said solenoid means, means in said circuit means associated with said doors and arranged to complete said circuit means when one of said doors is opened for the operation of said solenoid means to rotate said key plug to said "off" position, additional switch means in said circuit means including a switch associated with said brake pedal and arranged for opening said circuit means independently of said doors.

4. In a motor vehicle of the type in which is provided automatic transmission including shifting means shiftable into and out of a neutral position, and including doors, an ignition circuit, and an ignition lock-switch for the vehicle, said ignition lock-switch being adapted to be turned to an "on" position in which said ignition circuit is completed and to an "off" position in which said ignition circuit is broken; safety means for the vehicle comprising a first solenoid means coupled to said shifting means and arranged for the shifting thereof, a second solenoid means coupled to said lock-switch and arranged to turn the lock-switch to said "off" position, electrical circuit means controlling said first and second solenoid means, switches controlled by said doors and arranged in parallel, said switches being associated in said circuit means for operating same to shift said shifting means into neutral and to turn said lock-switch to said "off" position when a door is opened.

5. In a motor vehicle of the type in which are provided an ignition system including an ignition circuit, an ignition lock-switch, and a plurality of vehicle doors, said ignition lock-switch being adapted to be turned to an "on" position in which said ignition circuit is completed and to an "off" position in which said ignition circuit is broken; safety means for preventing the driver from leaving the vehicle with the ignition lock-switch in said "on" position comprising means coupled to said ignition lock-switch for turning said ignition lock-switch to said "off" position, electrical circuit means for controlling said means coupled to said ignition lock-switch, means in said circuit means associated with said doors and arranged to complete said circuit means when one of said doors is opened for the operation of said means coupled to said ignition lock-switch to turn said ignition lock-switch to said "off" position.

6. In a motor vehicle of the type of which are provided an ignition system including an ignition circuit, an ignition lock-switch, and vehicle doors, said ignition lock-switch including a rotatable key plug and being adapted to be turned to an "on" position in which said ignition circuit is completed and an "off" position in which said ignition circuit is broken; safety means for preventing the driver from leaving the vehicle with the ignition lock-switch in said "on" position comprising a crank-like arm coupled at one end to said key plug, a solenoid including a plunger hingedly attached to said crank-like arm adjacent the end of the arm opposite from said key plug, electrical circuit means for controlling said solenoid, means in said circuit means associated with said doors and arranged to complete said circuit means when one of said doors is opened for the operation of said solenoid to rotate said key plug and turn said lock-switch to said "off" position.

References Cited in the file of this patent

UNITED STATES PATENTS

| 2,626,003 | Kutzer | Jan. 20, 1953 |
| 2,642,145 | Feyes | June 16, 1953 |
| 2,740,947 | Davies | Apr. 3, 1956 |
| 2,793,706 | Moreland | May 28, 1957 |